United States Patent [19]

Parks

[11] Patent Number: 5,588,681
[45] Date of Patent: Dec. 31, 1996

[54] VALVE MOUNTING DEVICE USEFUL WITH FLEXIBLE PIPE

[76] Inventor: Alan D. Parks, 1351 Charlotte St., Altamonte Springs, Fla. 32701

[21] Appl. No.: 283,735

[22] Filed: Aug. 1, 1994

[51] Int. Cl.⁶ .................................................. F16L 5/00
[52] U.S. Cl. .............. 285/46; 285/64; 137/359; 137/360
[58] Field of Search ................. 285/46, 64; 137/359, 137/360

[56] References Cited

U.S. PATENT DOCUMENTS

| | | | |
|---|---|---|---|
| 1,115,696 | 11/1914 | Linbarger | 137/359 |
| 3,105,707 | 10/1963 | Jacobson | 137/359 |
| 3,669,141 | 6/1972 | Schmitt | 137/359 |
| 4,307,901 | 12/1981 | Orberg et al. | 285/64 |
| 4,473,244 | 9/1984 | Hill | 285/46 |
| 5,031,940 | 7/1991 | Stefanos | 285/64 |
| 5,305,785 | 4/1994 | Humber | 137/360 |

FOREIGN PATENT DOCUMENTS

| | | | |
|---|---|---|---|
| 6066676 | 7/1987 | Australia | 285/46 |
| 224591 | 9/1989 | Japan | 285/64 |
| 224590 | 9/1989 | Japan | 285/64 |
| 1-312289 | 12/1989 | Japan | 285/64 |
| 6066391 | 3/1994 | Japan | 285/64 |
| 2114694 | 8/1983 | United Kingdom | 285/64 |

*Primary Examiner*—Eric K. Nicholson
*Attorney, Agent, or Firm*—Allen, Dyer, Doppelt, Franjola & Milbrath, P.A.

[57] ABSTRACT

A valve mounting device holds a valve in a fixed position and prevents rotation of the valve during operation of the valve handle. The device includes a tubular sleeve dimensioned to receive a valve body and in one embodiment has a notch for receiving a valve supply tube exit typical in angle stop valves. The sleeve is affixed to a guide tube which bends the flexible pipe through a predetermined arc for engaging the valve and holding the sleeve end valve in position. The guide tube is affixed to a rigid structure such as a wall or partition member thereby holding the valve and pipe in a rigid position. Escutcheon plates are adapted to provide support to the guide tube and sleeve.

9 Claims, 7 Drawing Sheets

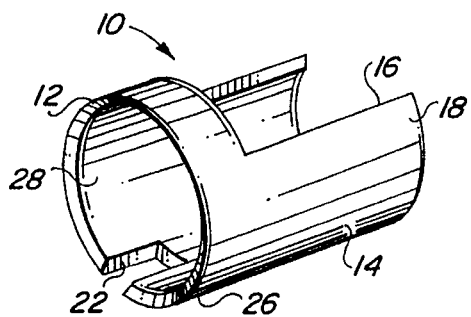
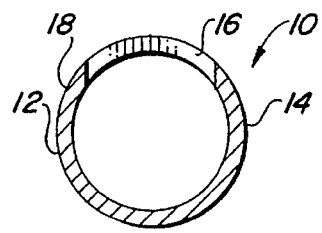
FIG.1a  FIG.1b
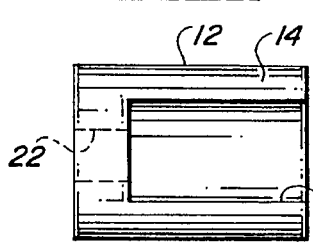 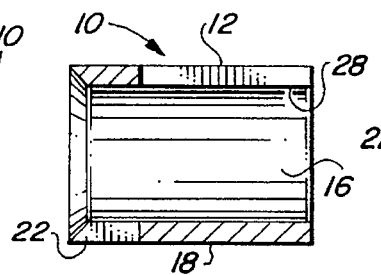 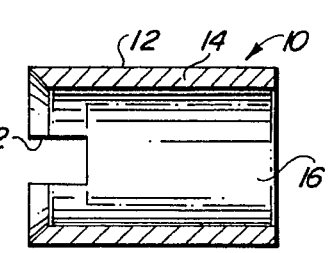
FIG.1c  FIG.1d  FIG.1e
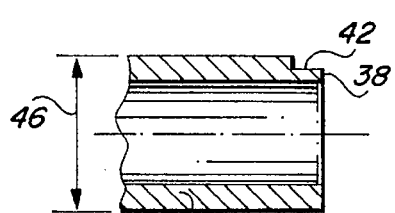 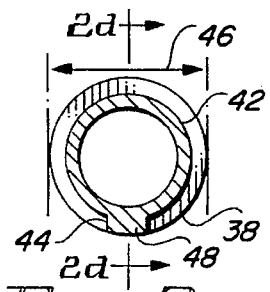
FIG.2d  FIG.2c
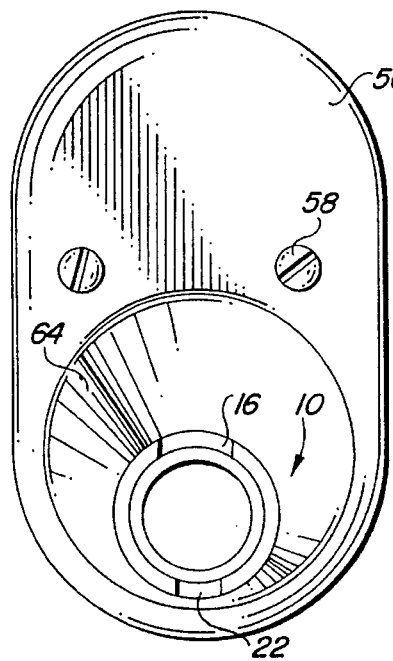 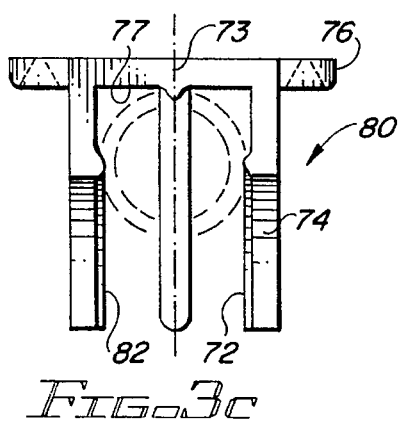 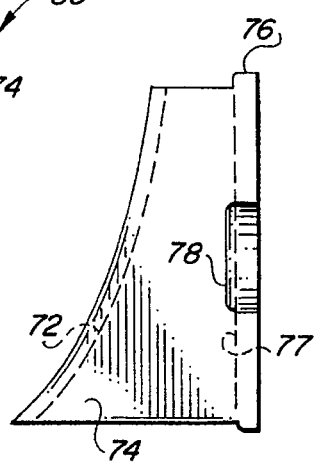
FIG.2b  FIG.3c  FIG.3d

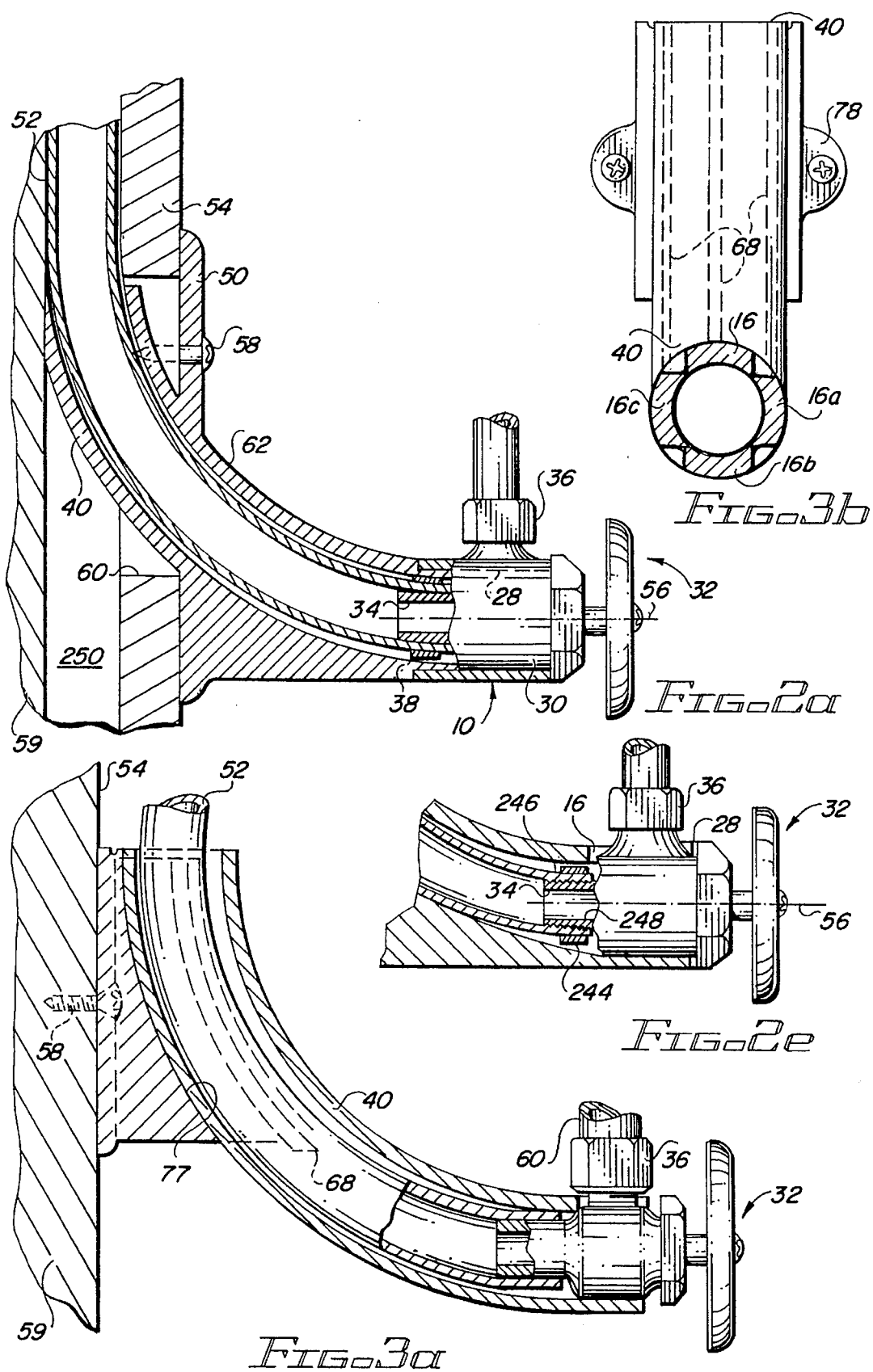

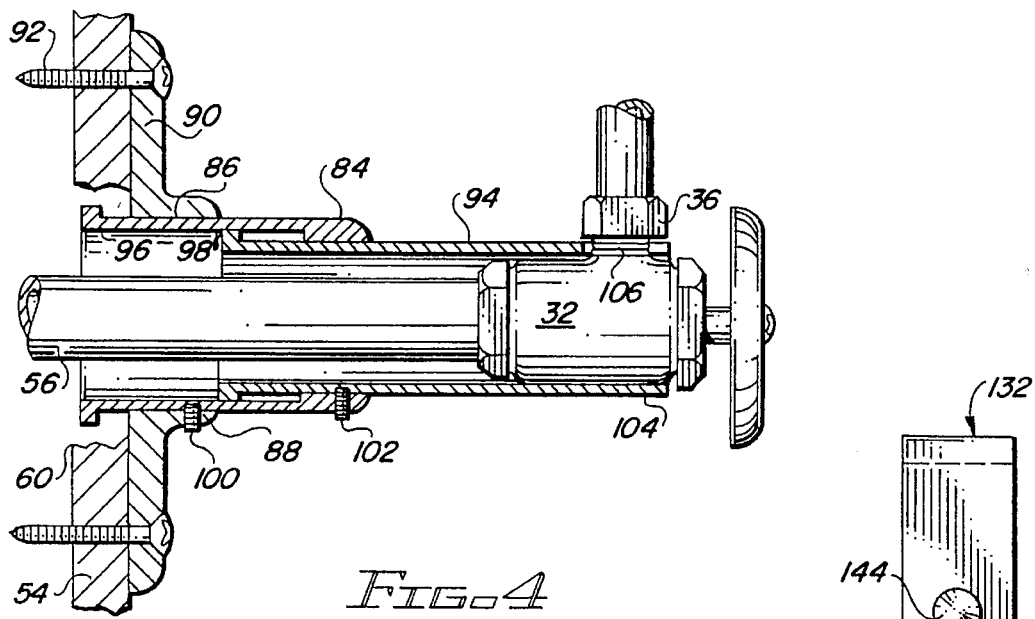
FIG. 4
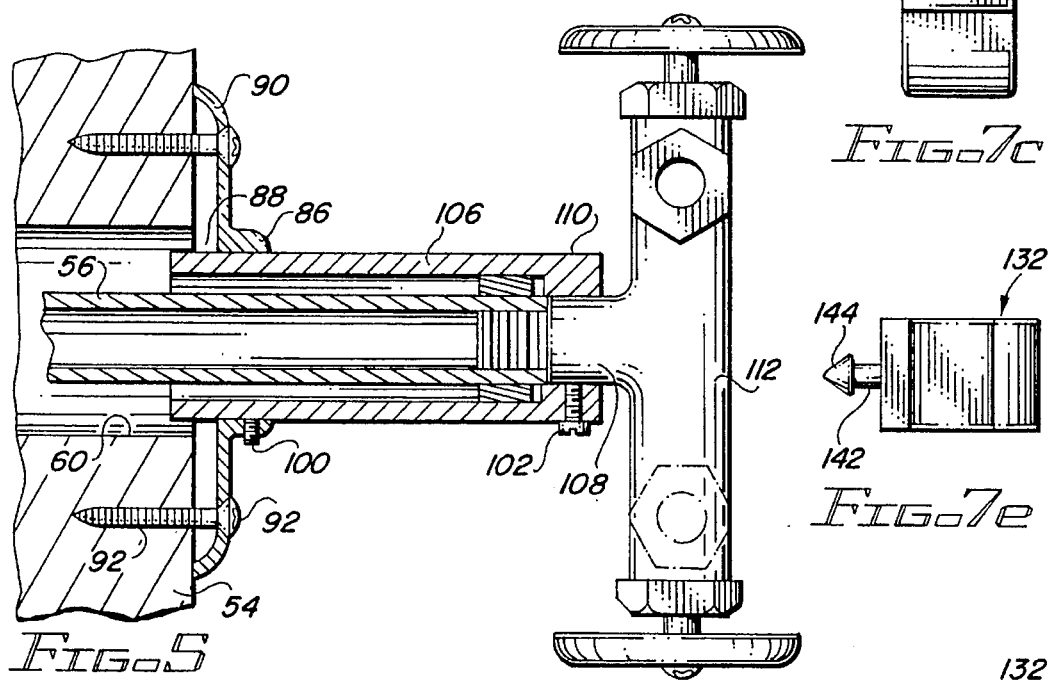
FIG. 5
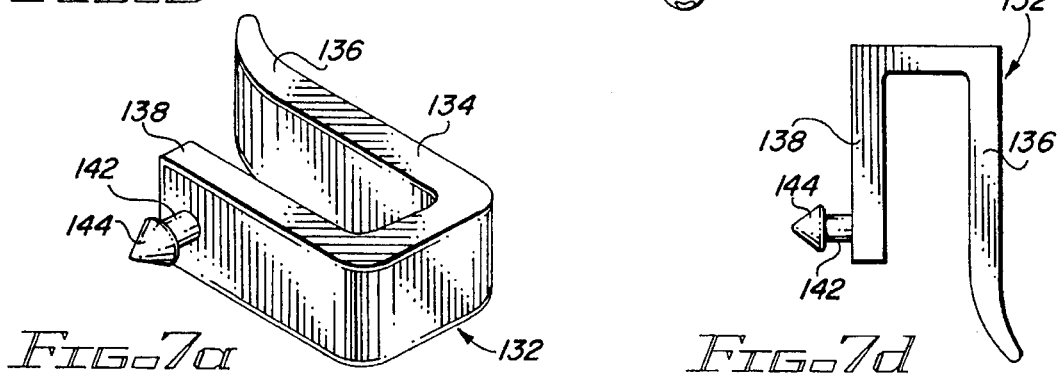
FIG. 7a
FIG. 7c
FIG. 7e
FIG. 7d

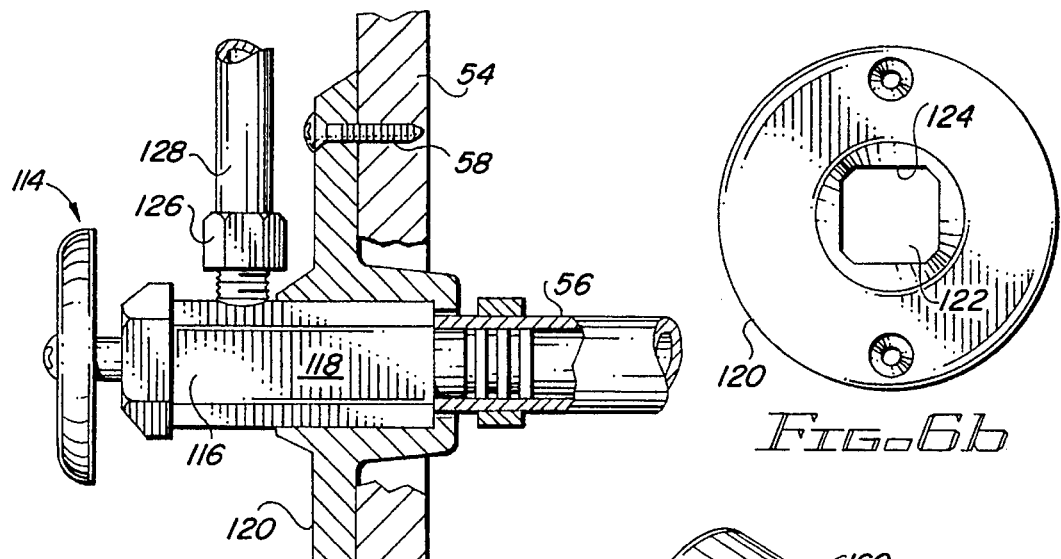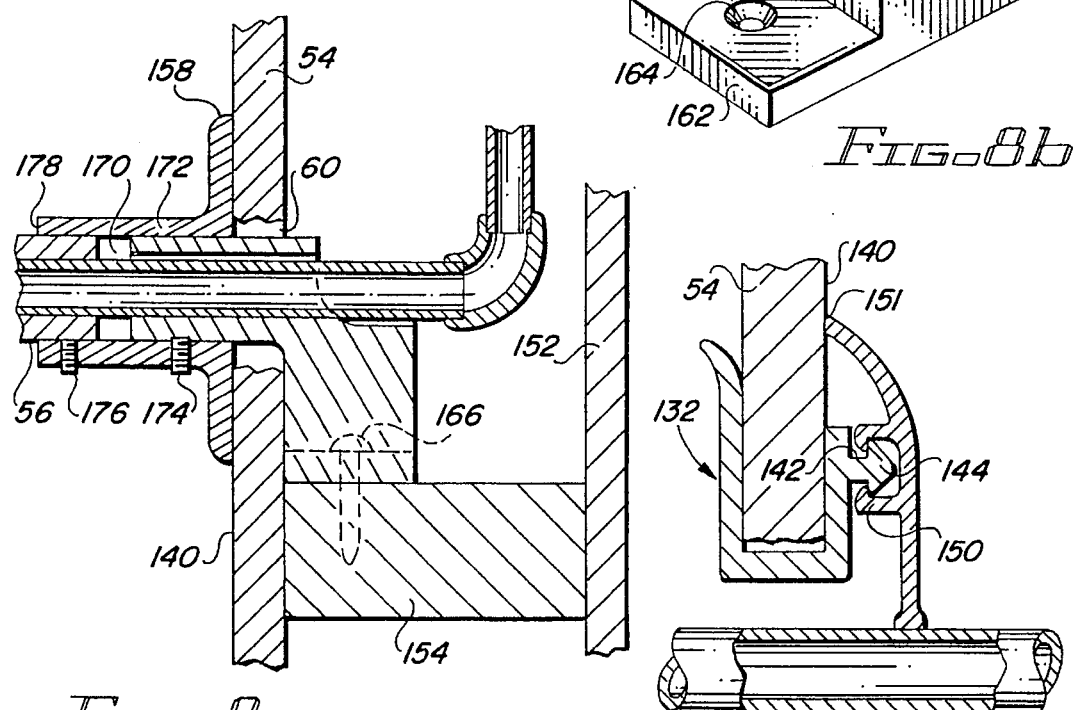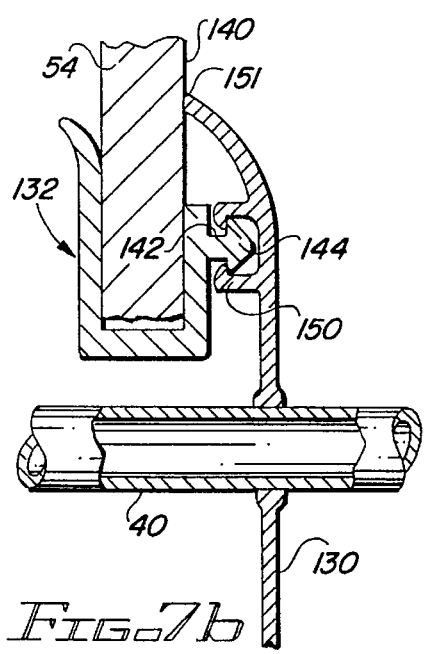

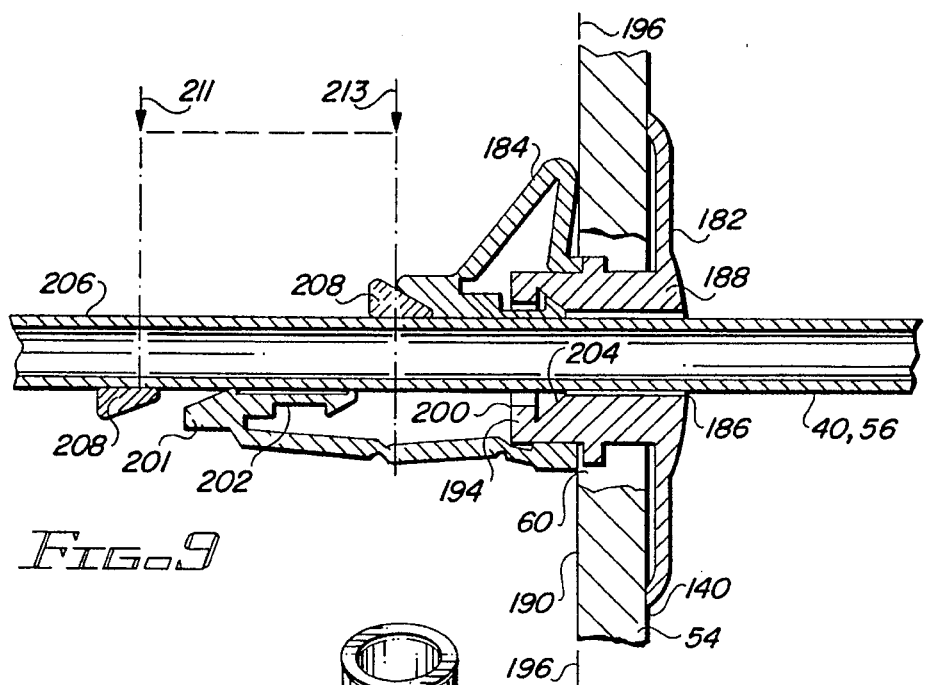
FIG.-9
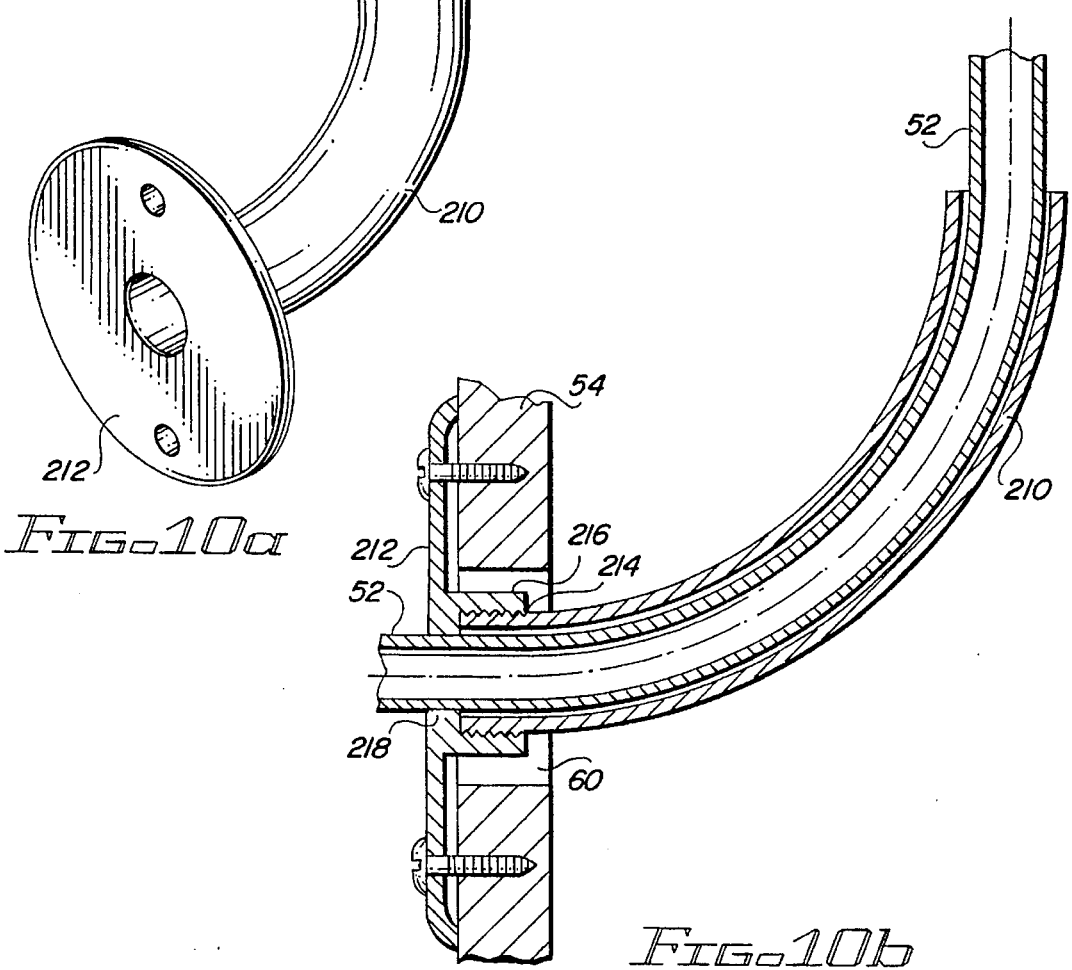
FIG.-10a
FIG.-10b

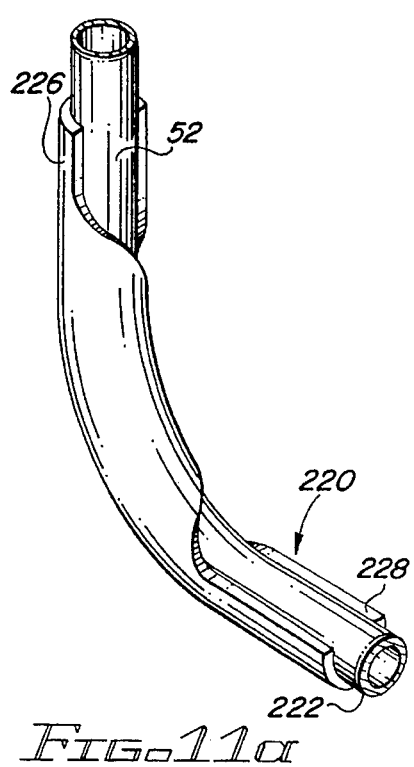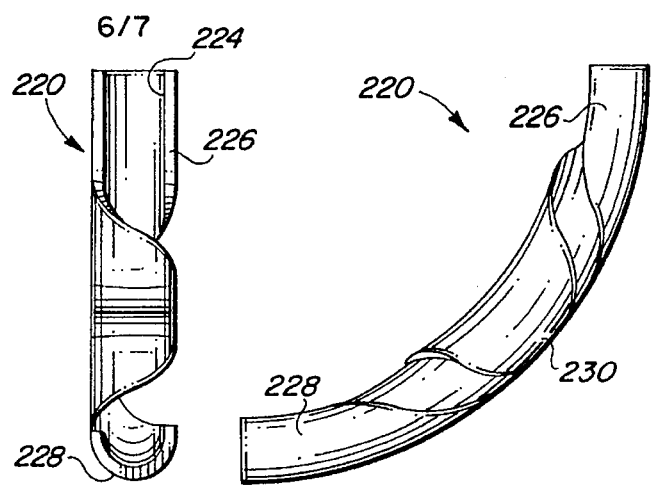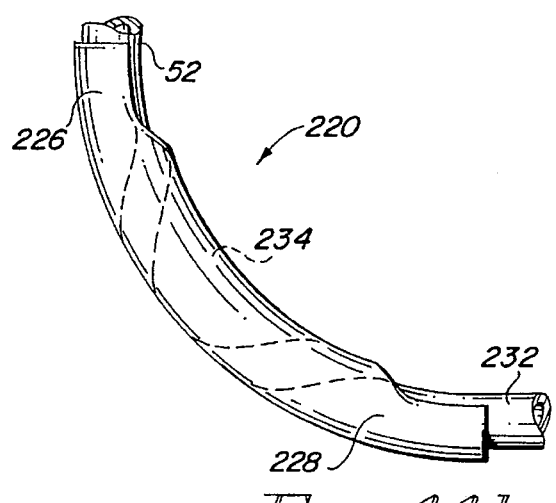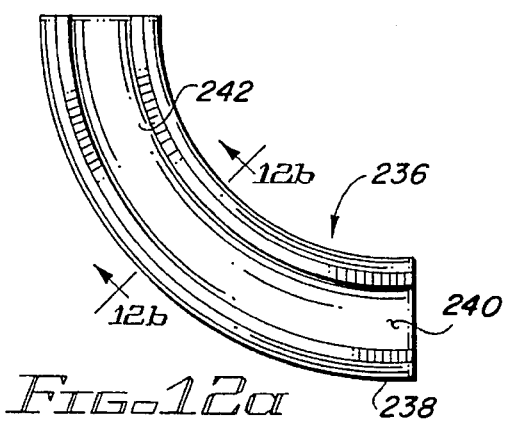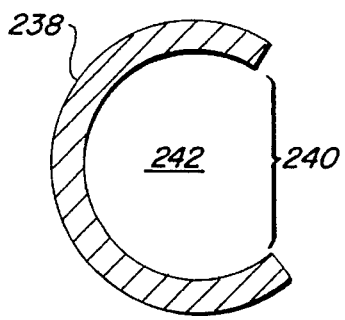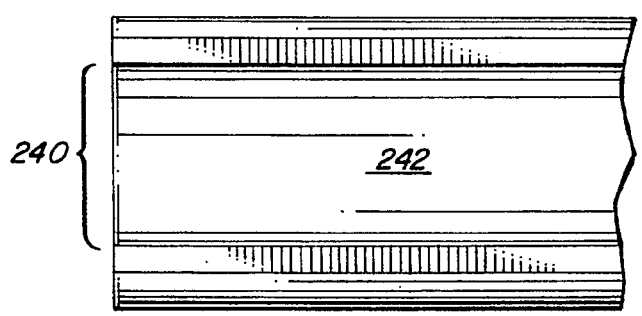

5,588,681

VALVE MOUNTING DEVICE USEFUL WITH FLEXIBLE PIPE

BACKGROUND OF INVENTION

1. Field of the Invention

The invention generally relates to the mounting of valves to flexible pipe within a typical plumbing system. More particularly, a mounting system provides for rigidly affixing a valve to a flexible pipe such as polybutylene passing through a structure such as a partition wall.

2. Background Art

Household water piping systems installed throughout the United States in the past decade have been composed primarily of one of three competing materials: The metal copper, and two synthetic materials, polybutylene (PB) and chlorinated polyvinyl chloride (CPVC). Copper systems have dominated usage since the 1950's and employ technology which was in part developed decades earlier for other types of metal pipe. Polybutylene and chlorinated polyvinyl chloride are synthetic polymers developed more recently. Chlorinated polyvinyl chloride came into use in the 1970's while polybutylene reached widespread use in the 1980's. The high cost of early deterioration and failure of copper water piping continues to lead to the use of polybutylene and chlorinated polyvinyl chloride piping systems. It is well-known that a need exists to replace copper systems with a code-approved piping material having more resistance to some of the possible causes of copper deterioration such as aggressive chemicals in the water or electrolysis.

In the early 1980's, the incidence of copper problems continued to increase. When polybutylene became more commercially available, more plumbing installations included the use of polybutylene. The cost savings associated with the use of polybutylene were clear and many installers felt that it would rapidly surpass copper in overall use. Such has not been the case. Continued consumer objections to the look and feel of polybutylene systems, especially in exposed areas, have slowed down the acceptance. Polybutylene has thus far been unable to fully replace copper in the residential construction market, especially in the upscale segment of such a market. Basically, copper remains a preference of consumers when appearance is a deciding factor.

Copper pipe is attractive and sturdy to the touch in exposed areas, while polybutylene is plain and its flexibility distressing even after assurances that polybutylene is strong and such flexibility can be an asset. Most consumers have used metal piping systems for years and have learned to equate rigidity with quality, and conversely associate flexibility with potentially serious problems. For the consumer, it is understandably difficult to ignore this deeply ingrained response when evaluating a polybutylene system.

It can be argued that manufacturers of polybutylene piping products have not developed new product designs to meet consumer standards, but instead have chosen to compete with copper only at the low end of the plumbing market. Such an argument is substantiated by two major marketing decisions by polybutylene pipe manufacturers. The first decision was to concentrate on the mobile home market segment, whose aesthetic standards for piping were not nearly as demanding as conventional construction standards. The small diameter, soft copper tubing in use with mobile home systems was already lacking in appearance and somewhat flexible to the touch especially in exposed areas. Polybutylene systems easily met the standards for use in this construction area and eventually dominated this mobile home market segment. Unfortunately, such success must have produced the false impression among manufacturers that further aesthetic improvements were not necessary.

The second marketing decision to manufacture and market acetal plastic fittings for use with polybutylene pipe created problems in the industry. Acetal plastic fittings proved to be very susceptable to chemicals found in the water transported by the pipe and also snapped as a result of stress fatigue. Such failures eventually led to a series of class action lawsuits inflicting financial damage to the polybutylene manufacturers and, more important, tarnished the public perception of polybutylene.

Prior to the introduction of synthetic piping materials, extremely rigid metals like red brass, galvanized iron, and hard drawn copper were used in household hot and cold water distribution systems. Because of their resistance to bending and twisting forces at points of user contact, such piping materials were strong enough and rigid enough to function as the sole structural support for other system components such as escutcheons or cover plates for opening around pipes, isolation valves or shut off valves, and outlet devices like laundry valves, hose bibbs, and faucets. This rigidity produced an overall tactile sensation of almost immovable solidity during consumer operation of such components. Conversely, consumers eventually discovered that the sensation of flexibility or looseness usually indicated a problem.

In terms of physical appearance, the most recent of these metal piping systems was the most attractive when carefully installed. Hard drawn copper systems with soldered joints and chrome components bore the same coloration as copper and silver, and thus appeared quite attractive to most consumers. Special plating colorations such as brass, gold, silver, and platinum are available for such components.

As described earlier, chlorinated polyvinyl chloride and polybutylene materials offer advantages over metal piping, but are markedly less rigid. Such flexibility becomes an asset in reducing installation costs but present a liability where rigidity is desirable. Neither CPVC nor PB offer the rigidity at points of user contact such as those described for metal pipes. The resulting tactile experience at points of user contacts can be distressing for those accustomed to the comforting solidity of metal piping.

Components typically used in the art and presented by way of example, include the cover plate and fluid nozzle disclosed in U.S. Pat. No. 4,562,964 issued on Jan. 7, 1986 to Harvey E. Diamond wherein a snap fitted and removable coverplate for covering the outwardly facing surface of a fluid nozzle body flange includes a body portion for covering such flange and tabs projecting from segments of the body portion removable into and out of alignment with portions of the flange defining an opening therethrough so as to be retained in engagement with the flange. The coverplate exposed surface has a finish different from the finish of the exposed surface of the flange, which coverplate finish may be selected so as to coordinate with the finish of other fitting in a bathroom.

U.S. Pat. No. 4,385,777 issued on May 31, 1983 to Daniel D. Logsdon disclosed a decorative escutcheon for inhibiting noise propagation. The escutcheon component system fits around a pipe at the point wherein the pipe projects through a wall. The back side of the escutcheon plate abuts against the wall. A hole through the escutcheon plate is sized so that a pipe can pass through it. An annular flange extends outwardly from the backside of the escutcheon plate and insert is formed of a flexible material compressed and inserted into the interior of the flange. An opening through the center of the insert allows the insert to be passed over the pipe and when located around the pipe, the insert will grip the pipe if the insert is then compressed within the interior of the flange. When the insert is located around the pipe and within the flange, frictional forces hold the escutcheon component system to the pipe.

U.S. Pat. No. 3,331,386 issued on Jul. 18, 1967 to W. E. Politz discloses an escutcheon mounting sleeve and body connecting means for making adjustments of the trim on the fitting being used. The sliding sleeve construction makes mounting an escutcheon on a sleeve and adjusting the escutcheon possible and accommodate variations in the depth of installation of the fitting behind a wall.

U.S. Pat. No. 2,708,449 issued on May 17, 1955 to W. A. Keithley disclosed a valve escutcheon tube for maintaining an escutcheon on a valve body.

U.S. Pat. No. 1,377,597 issued on May 10, 1921 to P. Mueller discloses an adjustable escutcheon for use on a pipe or shank without scratching, breaking or marring the escutcheon. It is pointed out that an advantage of the invention lies in the fact that no strain is exerted upon the escutcheon.

As included by way of example, such devices rely on the rigid nature of the pipe to which various fixtures and valves are attached.

The tactile and visual nature of a piping system would therefore seem to be an important factor for a consumer in making a decision on which system to use. Certainly, the system cost and life expectancy are also major considerations but it would seem that in order for flexible piping systems to be well accepted, the tactile and visual standards when compared to rigid piping system must be met. Tactile performance, or "feel" performance can be defined as the degree or resistance to bending or twisting forces experienced at points of normal contact and within normal ranges of force. Visual performance refers to the visual texture or color of exposed segments of the piping system including the components affixed thereto. In establishing need, a convenient and widely recognized standard for comparison can be the standard for hard drawn copper piping described earlier. Such a system does not equal the rigidity of galvanized iron, for example, but presents a degree of rigidity acceptable to most consumers. It has been accepted therefore that a pipe is rigid if its tactile performance equals or exceeds that of copper. Piping which does not meet such a standard is defined as flexible. On such a basis, chlorinated polyvinyl chloride and polybutylene are members of the flexible pipe family. Galvanized iron, red brass and copper are member of the rigid pipe family. Further, it is recognized in the art that rigid piping does not require additional support at interface contact areas, while flexible piping does require such additional support for components or products used in these areas.

There is clearly a need to provide devices and methods for mounting components such as valves and fixtures at interface contact areas such that the rigid piping standards are met yet provide such using flexible piping.

SUMMARY OF INVENTION

The present invention contemplates the use of a device for receiving a valve and affixing the valve in a position for preventing rotation of the valve during an operation of opening and closing the valve for delivering a supply of water to a supply tube. Such an anti-rotation device in combination with a guide tube and wall mounting escutcheon provide for the guiding of flexible pipe through the guide tube and thus through a wall for affixing the pipe to the valve in a rigid fashion.

The device useful with a valve communicating with the flexible pipe comprises means for guiding the flexible pipe through a predetermined orientation. The guiding means is adapted for engaging and holding the pipe for communicating with the valve. Further, means are provided for affixing the guiding means to a structural support that is sufficiently rigid for holding the guiding means in a fixed position. Further, means are provided for positioning the valve communicating with the flexible pipe. The positioning means communicates with the guiding means for holding the valve and preventing rotation of the valve during valve operation.

It is an object of the invention to provide a device and method for rigidly affixing a valve to flexible pipe. It is further an object of the invention to provide a device for guiding the flexible pipe through a partition wall for connecting the pipe to the valve. It is yet another object of the invention to provide for the mounting of a guide tube and valve to a rigid structure while further providing for the rigid placement of the valve.

BRIEF DESCRIPTION OF DRAWINGS

A complete and enabling disclosure of the present invention, including the best mode thereof, is directed to one of ordinary skill in the art in the present specification, including reference to the accompanying figures, in which:

FIG. 1a is a perspective view of an anti-rotational device used within the present invention;

FIGS. 1b through 1e illustrate the device of FIG. 1 in end, top, cross-sectional side, and cross-sectional top views thereof;

FIG. 2a is a partial cross-sectional view of the device of FIG. 1 used in combination with a guide tube and wall mounting escutcheon;

FIG. 2b is a partial front view of the device as illustrated in FIG. 2a;

FIG. 2c is an end view of the guide tube of FIG. 2a;

FIG. 2d is a partial cross-sectional view of the guide tube end portion of FIG. 2a;

FIG. 2e is a partial cross-sectional view of the embodiment of FIG. 2a further illustrating an integrally formed embodiment of the invention;

FIG. 3a is a partial cross-sectional view of an alternate embodiment of the device of FIG. 1 in combination with a guide tube and mounting means;

FIGS. 3b and 3c are partial front and top views of the device as illustrated in FIG. 3a;

FIG. 3d is a partial side view of the mounting means illustrated in FIGS. 3a through 3c;

FIG. 4 illustrates the use of the anti-rotation device in combination with a telescoping guide tube and wall mounted escutcheon;

FIG. 5 illustrates the use of extendable guide tube and wall mounting escutcheon using an alternate means for affixing a valve;

FIG. 6a is a partial cross-sectional view of a wall mounting escutcheon having a multifaced guide tube for receiving a body valve;

FIG. 6b is a front view of the device of FIG. 6a;

FIG. 7a is a perspective view of an escutcheon mounting clamp;

FIG. 7b is a partial cross-sectional view of the escutcheon mounting clamp of FIG. 7a illustrated in combination with an escutcheon and pipe;

FIGS. 7c through 7e are end, side and top views of the clamp illustrated in FIG. 7a;

FIG. 8a is a partial cross-sectional view of the pipe anchoring device of FIG. 8b illustrating its use in combination with an escutcheon and valve;

FIG. 8b is a perspective view of a pipe anchoring device;

FIG. 9 is a partial cross-sectional view of self-mounting escutcheon and guide tube;

FIG. 10a is a perspective view of an alternate embodiment of an escutcheon and guide tube;

FIG. 10b is a partial cross-sectional view of the escutcheon and guide tube of FIG. 10a;

FIG. 11a is a perspective view of a retrofit guide tube; and

FIGS. 11b through 11d are left side, front side, and right side views of the retrofit guide tube of FIG. 11a.

FIG. 12a illustrates an alternate embodiment of a guide tube having an open side wall for passing a flexible pipe therethrough;

FIG. 12b is a cross-sectional view of FIG. 12a;

FIG. 12c is a partial side view of FIG. 12a; and

DETAILED DESCRIPTION OF PREFERRED EMBODIMENT

Figure 13A:
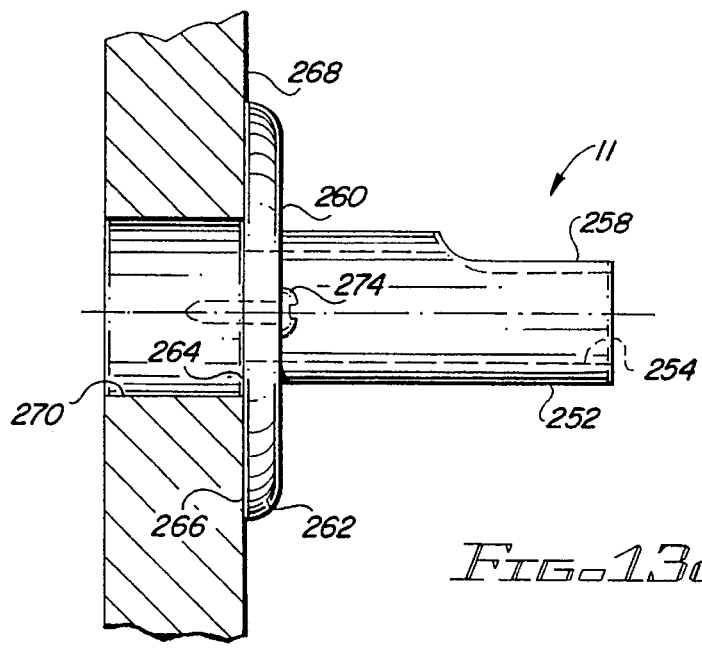
FIGS. 13a through 13c are side, top and end views of an alternate embodiment of the present invention.

In the preferred embodiment of the invention, a sleeve 10 comprises a cylindrical tube 12 having a tube wall 14. As illustrated with reference to FIGS. 1a–1e, a first notch is positioned in a first portion 18 of a first end 20 of the tube 12. A second notch 22 is positioned at a second end 24 of the tube 12. The second notch 22 is placed within a second tube wall portion 26 opposing the tube wall first portion 18.

By way of example, and as illustrated with reference to FIG. 2a, the sleeve 10 has a bore 28 dimensioned to receive a valve body 30 of a typical angle stop valve having a service line input end 34 and a supply tube exit end 36 wherein an axis of the supply tube exit end 36 is perpendicular to an axis of the valve body 30. The first notch 16 is dimensioned to closely receive the supply tube exit end 36 and thus hold the valve 32 in a fixed position relative to the sleeve 10.

Again with reference to FIGS. 2a–2e, the sleeve 10 is affixed to a first end 38 of a guide tube 40. The guide tube first end 38 is dimensioned to communicate with a cylindrical tube 12. In a preferred embodiment of the invention, and as illustrated in FIGS. 2c and 2d, the guide tube first end 38 has a notch 42 formed substantially around the perimeter of the guide tube first end 38 wherein an outside diameter of the guide tube along the notch 42 is such to be closely received by the sleeve bore 28. It is anticipated that alternate forms of the embodiment shown in FIG. 2a will integrally form the sleeve 10 to the guide tube first end 38 as illustrated with reference to FIG. 2e. A portion 44 of the guide tube first end 38 maintains a guide tube outside diameter dimension 46 and has a width 48 for communicating with the sleeve second notch 22. With such an arrangement, the sleeve 10 receives the guide tube first end 38 and is limited in rotation about its axis by the second notch 22 mating with the guide tube end portion 44.

With further reference to FIG. 2a, the guide tube 40 is affixed to an escutcheon 50. By way of example, the guide tube 40 of FIG. 2a represents a 90° guide tube for directing flexible pipe 52 through a petition wall 54 and positioning the valve 32 such that a valve body axis is held substantially perpendicular to the wall 54. In the embodiment illustrated in FIGS. 2a–2e, the escutcheon 50 comprises mounting holes for receiving screws 58 for affixing the escutcheon to the wall 54 as further illustrated with reference to FIG. 2b.

By way of example, and again with reference to FIG. 2b, the flexible pipe 52 typically run between a block wall 59 and the petition wall 54 is guided through a wall opening 60 for connection to a valve 32. In the preferred embodiment of the present invention, the guide tube 40 passes through an escutcheon central portion 62 wherein an escutcheon housing 64 holds the guide tube 40 in a fixed position. In the preferred embodiment of the present invention, the escutcheon 50, escutcheon housing 64 and guide tube 40 are integrally formed in a molded embodiment.

With such an arrangement as described with reference to FIG. 2a, the valve 32 is affixed to an end of flexible pipe 52 which typically supplies water to the valve. In the angle stop valve 32 illustrated in FIG. 2a, the supply tube exit end 36 is held in position within the first notch 16 of the sleeve 10. In such a manner, the valve 32 may be operated for closing the valve and opening the valve while the sleeve 10 and guide tube 40 affix the valve in a position so as not to rotate during operation of the valve. In an alternate embodiment (not shown) the sleeve 10 is integrally formed with an end of the guide tube 38. As illustrated with reference to FIG. 3a–3d, the guide tube 40 in yet another embodiment comprises a first notch 16 as described earlier with reference to the sleeve 10 or sleeve 10 in combination with the guide tube first end 38 for holding the supply tube exit end 36 of the angle stop valve 32 in a first position typically directing a supply tube 66 communicating with the supply tube exit end 36 in a vertical direction typically upward toward a fixture (not shown). By relocating the guide tube first end portion 44 at various radial positions about the axis 56 of the valve body 30, the supply tube exit end 36 is held in various positions. In the alternate embodiment illustrated in FIGS. 3a–3d, multiple first notches 16, 16a, 16b and 16c are provided wherein each of the first notches 16 through 16c is positioned for holding the supply tube exit end 36 in a vertically upward horizontally right vertically downward and horizontally left position respectively. With such an arrangement, an angle stop valve 32 as shown by way of example in the earlier described drawings, can be directed at a predetermined position for providing the supply tube 66 to a fixture (not shown) located at various radial locations relative to the stop valve 32.

Again with reference to FIGS. 3a–3d, the guide tube 40 comprises elongated grooves 68 positioned proximate a second end 70 of the guide tube 40. The elongated grooves 68 are dimensioned for receiving rib members 72 formed to and made a part of bracket side walls 74 affixed to a bracket base plate 76. The base plate 76 further has mounting flanges 78 affixed to a part of the base plate 76 for mounting wall bracket 80 to the petition wall 54. With specific reference to FIGS. 3b, 3c and 3d illustrating front, top and side views of the wall bracket 80, the preferred embodiment of the snap on wall bracket 80 is illustrated and shown to have two bracket side walls 74 generally parallel to each other and separated for tightly receiving the guide tube 40. The rib members 72 are positioned on inside surfaces 82 of the bracket side walls 74. Further, a rib 73 is affixed to a surface portion 77 of the base plate 76 communicating with the guide tube 40. The guide tube 40 is held in position when the rib members 72 and 73 are held removably affixed within the guide tube wall grooves 68. By affixing the base plate 76 to the wall 54 using screws 58 by way of example, the bracket 80 and thus the guide tube 40 are held in a fixed position and thus permit the stop valve 32 to be affixed to flexible pipe 52 guided through the guide tube 40 and held in a predetermined and fixed position as described earlier. With such an arrangement, as illustrated in FIGS. 3a–3d, the flexible pipe 52 reaching a location for providing water to a fixture through the angle stop valve 32 satisfied the need for affixing the stop valve 32 in a position so as not to rotate during operation of the stop valve 32 as earlier described with reference to FIGS. 2a–2e.

In yet another embodiment of the preferred invention a telescoping guide tube 84 as illustrated with reference to FIG. 4, is dimensioned to slidably fit within a tube portion 86 having an opening 88 for closely receiving the telescoping guide tube 84. The tube portion 86 is integrally formed as part of an escutcheon 90 having fastening means 92 for affixing the escutcheon to a wall 54 in such a way that the telescoping guide tube 54 passes through the wall opening 60 covered by the escutcheon 90. In one embodiment, the telescoping guide tube 84 has a first guide tube 94 dimensioned to be received by a second guide tube 96 wherein the first guide tube 94 slidably fits within the second guide tube 96. In turn, the second guide tube 96 is dimensioned to slidably fit within the escutcheon opening 88. Further, the first and second guide tubes 94 and 96 have stops 98 affixed to ends of the guide tubes in a fashion well known in the art for limiting the telescoping of the tubes to a predetermined dimension. A first set screw 100 passes through the escutcheon tube 86 and contacts a portion of the second guide tube for holding the second guide tube 96 in a fixed position. A second set screw 102 passes through the wall of the second guide tube 96 for affixing to the first guide tube 94 and holding the first guide tube 94 in a fixed position relative to the second guide tube 96 thus providing predetermined positions for holding the telescoping guide tube 84 receiving the stop valve 32. As described earlier, the stop valve 32 is received by the guide tube 84 at an end 104 wherein the end 104 has the sleeve 10 affixed thereto or as illustrated by way of example in FIG. 4, a notch 106 dimensioned and positioned for receiving the valve supply tube exit end 36 and holding it in a fixed position during the operation of the valve. The flexible pipe 56 is affixed to the valve 32 in a well known fashion.

In a variation of the embodiment as earlier described with reference to FIG. 4, yet another embodiment as illustrated in FIG. 5 comprises the escutcheon 90 receiving a single guide tube 106 wherein the first set screw 100 locks the guide tube 106 to the escutcheon 90 at the escutcheon tube 86 and the second set screw 102 passing through the guide tube 106 affixes to a portion of the tube 108 received by the tube 106 at an end 110. With such an arrangement, another valve such as a dual stop valve 112 shown by way of example with reference to FIG. 5 can be held in a predetermined fixed position during operation of the valve 112. As described earlier, the escutcheon 90 is affixed to a wall 54 with mounting screws or means 92 in such a way that the flexible pipe 56 passes through an opening 60 in the wall 54.

It is well known in the art that valves such as the angle stop valve 32 and the dual stop valve 112 are manufactured having unique characteristics. By way of example and with reference to an alternate angle stop valve 114 as illustrated with reference to FIGS. 6a–6b, the angle stop valve 114 has a valve body 116 having multiple faces 118 about the perimeter about the valve body 116. In the example illustrated with reference to FIG. 6, the valve body 116 has eight faces 118. With such a body configuration, an escutcheon 120 comprises an opening 122 having multiple surfaces 124 defining the opening 122 wherein the surfaces 124 are dimensioned and configured to closely receive the body faces 118 of the valve body 116. By mounting the escutcheon 112 to a wall 54 as earlier described, and removably affixing the valve body 116 into the opening 122, the valve 114 is held in a fixed position during operation of the valve. With such an arrangement, the valve body 116 can be removed from the opening 122, rotated to a predetermined orientation and replaced into the opening 122 for affixing the valve 114 in yet another predetermined position for orienting the supply tube exit end 126 of the valve 114 and thus the supply tube 128 in a predetermined orientation. Such an embodiment provides yet another method for preventing the rotation of the valve 114 during operation and thus satisfies the need as earlier described within the specification.

As described earlier in the specification, fastening means 58 shown by way of example comprises screws passing through the escutcheon 50 as illustrated with reference to FIGS. 2a–2e and FIGS. 6a and 6b. In an alternate method for mounting an escutcheon 130 to a wall 54 as illustrated with reference to FIGS. 7a–7e, an escutcheon mounting clip 132 is used. With specific reference to FIG. 7a and FIGS. 7c through 7e, the escutcheon mounting clip 132 comprises a U-shaped clamp portion 134 having first and second arms 136 and 138. The first arm 136 is separated and generally parallel to the second arm 38 for receiving the wall 54. As illustrated by way of example with reference to FIG. 7b, the clamp portion 134 closely receives the wall 154 for holding the clamp in a fixed position. The second arm 138 is positioned on an outside surface 140 of the wall 54. A dowel 142 extends outwardly from the second arm 138. The dowel 154 has a flanged tip 144. The escutcheon 130 of the described embodiment comprises extension members 146 extending from an inside surface 148 of the escutcheon 130. The extension members have inwardly turned flanged ends 150 for receiving the flanged tip 144 of the dowel 142 and affixing the escutcheon 130 to the mounting clip 132. The dowel 142 and extension members 146 are dimensioned for holding an edge 151 of the escutcheon 130 tightly against the wall outside surface 140 and thus provides an alternate fastening means for affixing the escutcheon 130 to the wall 54 for holding the guide tube or flexible pipe 40 and 52 in a predetermined position for passing through an opening 60 in the wall 54.

As is well known in the art, the wall 54 having the opening 60 is often found in combination with an opposing wall 152 generally parallel to the wall 54 and separated by a mounting structure 154 such as a two by four. With such an arrangement, a type anchoring device 156 is used in combination with an escutcheon 158 wherein the anchoring device 156 is fastened to the mounting structure 154 and escutcheon 158 is affixed to a tubular member portion 160 of the anchoring device 156 thereby relieving the need for affixing the escutcheon 158 to the wall 54. With reference to FIGS. 8a and 8b, the anchoring device in one embodiment of the invention comprises a baseplate 162 having holes 164 wherein screws 166 pass through the holes 164 for mounting the baseplate 162 to the mounting structure 154. The tube member 160 is affixed to the baseplate 162 in one embodiment of the anchoring device 156, the baseplate 162 and tube member 160 are integrally formed and have a mounting portion 168 affixing an outside wall of the tube member 160 to a surface of the baseplate 162. The mounting portion 168 is dimensioned to position the tube member 160 a predetermined distance from the baseplate 162 for passing the tube member 160 through the wall opening 60 and affixing the baseplate 162 to the mounting structure 154 as illustrated with reference to FIG. 8a. Once the anchoring device 156 is in position, the escutcheon 158 receives the tube member 160 through an opening 170 in the escutcheon 158. In the embodiment described by way of example, the escutcheon 158 comprises a tube portion 172 extending outwardly from the escutcheon 158 having the opening 170. The tube member 160 extends partially into the escutcheon tube portion 172 wherein a set screw 174 passing through the escutcheon tube portion 172 affixes the escutcheon 158 to the tube member 160. Further, in one embodiment, a second set screw 176 passes through an end portion 178 of the tube portion 172 for affixing a valve body 180 within the escutcheon tube end portion 178. The escutcheon opening 170 is dimensioned for receiving the tube member 160 and the valve body 180. With such an arrangement, a valve has its valve body 180 affixed to the escutcheon 158 which in turn is affixed to the anchoring device 156 mounted to the mounting structure 154 for securing the valve in a fixed position during operation.

In yet another embodiment, an escutcheon 182 comprises hingeable arm portions 184 for affixing the escutcheon 182 to a wall 54 for holding the escutcheon 182 in position while permitting a guide tube 40 or pipe 56 to pass through an opening 186 in the escutcheon 182 as illustrated with reference to FIG. 9. As illustrated in FIG. 9, the escutcheon 182 comprises a tube portion 188 affixed to a center portion 190 of the escutcheon 182. The escutcheon opening 186 passes through the escutcheon 182 and connecting tube portion 188. In the preferred embodiment, the escutcheon tube portion and escutcheon are integrally formed. Again with reference to FIG. 9, the escutcheon tube portion 188 is dimensioned to loosely fit through the wall opening 60 and extend beyond a back surface 190 of the wall 54. The escutcheon 182 rests against the wall outside surface 140. The hingeable arm 184 has a first end 192 affixed to an outside surface 194 of the escutcheon tube portion 188 at a location approximate an imaginary plane 196 passing through the wall back surface 190. A hingeable arm second end 198 comprises a slide member 200 hingeably attached to the arm second end. The slide member 200 has a locking end positioned for being received by a flanged end portion 202 located at the escutcheon tube inside surface 204.

In the preferred embodiment, at least two hingeable arms 184 are affixed to the escutcheon tube portion 188. Further, a guide tube or pipe 206 is dimensioned to be closely received by the escutcheon opening 186. A friction ring 208 is affixed about the perimeter of the guide tube 206. As the guide tube 206 is made to pass through the escutcheon opening 186 from the wall back surface 190, the friction ring 208 biases against the slide member 201 and causes the hingeable arm 184 to bend permitting the locking end 202 to be affixed within the flanged end portion 200 located at the inside surface 204 of the escutcheon tube inside surface 194. As illustrated with reference to FIG. 9, the hingeable arm 184 moves from a first position 211 where the friction ring 208 is out of contact with the slide member 200 and the hingeable arm 184 is extended to a second position 213 where the friction ring 208 biases against the slide member 200 causing the locking end 202 to be affixed within the flanged end portion 200. In this second position 213, a portion of the hingeable arm 184 biases against the wall back surface 190 affixing the escutcheon 182 against the wall outside surface 140. With such an arrangement, the escutcheon 182 is affixed for holding the guide tube or pipe 206 in a predetermined position. The escutcheon 182 locked in position is then used as described or in combination with the earlier guide tube assemblies described with reference to FIGS. 2a-2e, 3a-3d, 4, 5 and 6a-6b.

In yet another combination of guide tube 210 and escutcheon 212 as illustrated with reference to FIGS. 10a and 10b, the guide tube 210 comprises an arcuate shape and has a threaded end 214 for receiving an escutcheon tube portion 216 having threaded interior bore for receiving the guide tube threaded end 214. The escutcheon 212 has holes 218 for affixing the escutcheon to a wall 54 as earlier described. Further, as earlier described, the wall opening 60 is sufficient to receive the escutcheon tube portion 216 and guide tube 210. With such an arrangement, the flexible pipe 52 is guided through the guide tube 210 for extending through the escutcheon 212 by passing through the escutcheon tube portion 216 having an opening 218 as earlier described in the specification.

With reference to the illustrations of FIGS. 11a through 11d, a retrofit guide tube 220 is dimensioned to route a flexible pipe through a 90° angle without the need for passing a pipe end 222 through a guide tube bore 224 as was described earlier in the specification. With the embodiment of the retrofit guide tube 220, the flexible pipe 52 may be bent at a 90° angle or any other predetermined angle set by the guide tube 220 along any position of the pipe 52. With specific reference to FIGS. 11b through 11d, the retrofit guide tube comprises a tube upper wall portion 226 having an opening sufficient for receiving the flexible pipe 52 and a lower wall portion 228 having an opening sufficient to receive the pipe 52. The retrofit guide tube 220, further comprises a central wall portion 230 having an opening sufficient to receive the flexible pipe 52 wherein the central wall portion 230 biases the flexible pipe 52 against the lower wall portion 228 and upper wall portion 226 for holding the flexible pipe in the desired angled bend. By way of example, the 90° retrofit guide tube 220 illustrated in FIGS. 11a–11d has lower 228 and upper 226 wall portions for supporting a bottom portion 232 of the pipe 52 and the central wall portion 230 for biasing against a pipe top surface 234 and holding the pipe in a 90° bend position. The pipe 52 is position within the guide tube 220 by weaving the pipe through the open wall portions of the guide tube 220. With such an embodiment, the retrofit guide tube 220 is used to bend the pipe 52 at arbitrary locations along extended lengths of pipe 52 to suit the need being serviced.

As described earlier with reference to FIGS. 10a and 10b, an arcuate guide tube 210 is configured for receiving an escutcheon tube 216. The arcuate guide tube 210 has an elbow-shaped tube configuration that receives the flexible pipe 52 through one end until reaching a desired area. The advantages of such a closed arcuate tube 210 are simplicity, strength and minimum shifting or dislodging during pipe installation. As described, the flexible pipe 52 must be pushed through an end of the guide tube 210 for passing therethrough. Such a guide tube 210 is used in the present invention to bend the flexible pipe 52 through a desired arc. In the illustration of FIGS. 10a and 10b, the pipe 52 is taken through a 90° bend. To bend a flexible pipe at an arbitrary location along the pipe, the retrofit guide tube 220 is used as herein described. In an alternate embodiment of a retrofit guide tube 220, an open walled guide tube 236 is used. As illustrated by way of example in FIG. 12, the open wall guide tube 236 comprises an arcuate tube 238 having a portion of its sidewall removed to form an opening 240 for receiving flexible pipe. The opening 240 is such that flexible pipe is passed into the bore 242 of the tube 238 through the opening 240. The open sidewall 240 provides an advantage for easily bending a flexible pipe and inserting it into the bore 242.

The selection of a bending radius for any of the above-described guide tubes depends on the pipe material, pipe diameter, pipe wall thickness, manufacturers requirements, and testing or code authority requirements. For example, the maximum bending radius is usually expressed in multiples of the pipe inside diameter and describes the safe range for bending pipe before the likelihood of kinking becomes great. Therefore, the maximum bending radius must be considered when configuring guide tube dimensions.

Figure 13B:
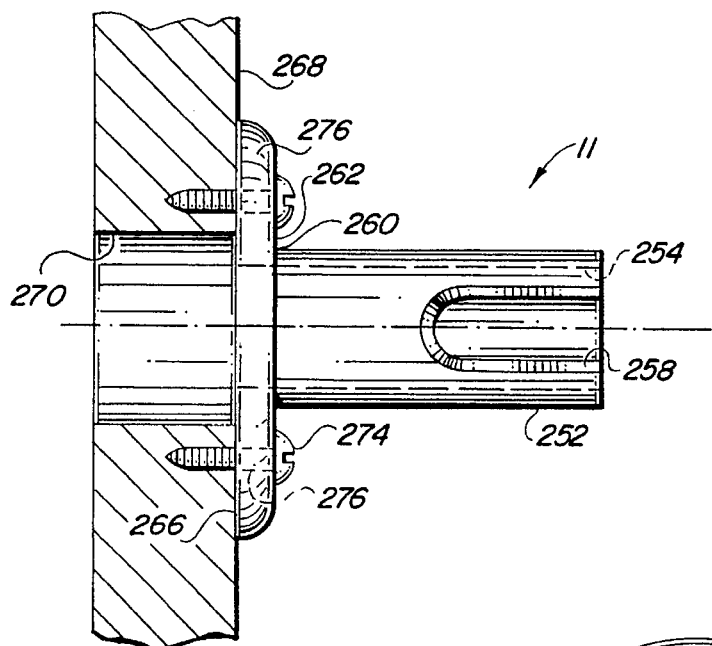
Figure 13C:
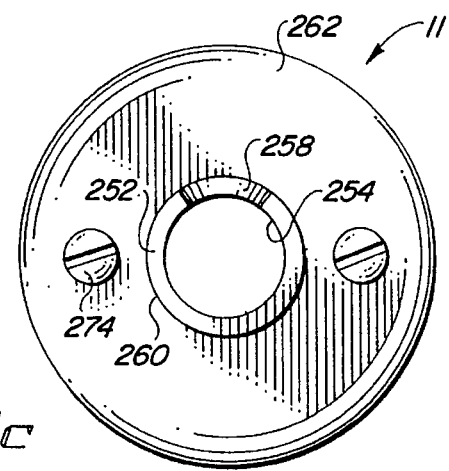

As was discussed earlier with reference to FIG. 2e, alternate forms of the preferred embodiments will have elements of the embodiments integrally formed typically through well known molding techniques. Again with reference to the molded form of the embodiment illustrated in FIG. 2e, the flexible pipe 52 is received by the guide tube 40 for communicating with the angle stop valve 32. As is well known in the art, a crimping ring 244 will typically be used to affix a pipe end 246 to a nipple 248 formed at the valve input end 34. As earlier described, the supply tube exit end 36 of the valve 32 is received by the notch 16. In the integrally formed embodiment illustrated in FIG. 2e and FIG. 2a, the second notch 22 described with reference to FIGS. 1a–1e and 2a will no longer be needed because of the molding techniques used to integrally form the embodiment. Further, the embodiment of FIG. 2e and FIG. 2a is useful when guiding the flexible pipe 52 through the wall opening 60 especially when a narrow space 250 exists between the partition wall 54 and the block wall 59. Where situations exist requiring a generally straight through passage of the pipe 52 through the wall opening 60, it is anticipated that the simpler embodiment illustrated with reference to FIGS. 13a through 13c will be used. In yet another embodiment of the present invention, and as illustrated with reference to FIGS. 13a through 13c, the mounting device 11 is uniformly molded to include a tube 252 having a bore 254 or tube opening dimensioned to receive a valve (not shown). One end 256 of the tube comprises a notch 258 as earlier described as the first notch 16 of the embodiment illustrated with reference to FIG. 1a–1e. A second end 260 of the tube is affixed to an escutcheon 262 wherein the tube opening 254 continues through the escutcheon central portion 264 for permitting a flexible pipe therethrough. A backface 266 of the escutcheon is dimensioned to be mounted against a wall outside surface 268. The escutcheon 262 is further sized to be mounted to the wall surface 268 and cover a wall opening 270 through which the flexible pipe will pass. It is anticipated that such an embodiment of the device 11 will be used to fasten the device 11 to a wall 272 using screws 274 or the like passing through holes 276 within peripheral portions of the escutcheon.

While specific embodiments of the invention have been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions, methods of use, and reasonable mechanical equivalence thereof obvious to those skilled in the art are set forth in the appended claims.

What is claimed is:

1. A mounting device useful with a valve communicating with flexible pipe, the device comprising:

means for guiding a flexible pipe through a predetermined orientation, the guiding means adapted for engaging and holding the pipe for communicating with a valve;

means for affixing the guiding means to a structural support, the support sufficiently rigid for holding the guiding means in a fixed position; and means for positioning a valve communicating with the flexible pipe, the valve having a supply tube exit portion extending radially therefrom, the positioning means having a tubular sleeve for receiving the valve, the tubular sleeve affixed to and communicating with the guiding means for receiving the flexible pipe, the tubular sleeve further having a notch at an exit end for receiving the supply tube exit portion for preventing valve rotation during valve operation.

2. The device as recited in claim 1, wherein the guiding means comprises a rigid tubular member dimensioned for receiving the flexible pipe and holding the pipe in the predetermined orientation.

3. The device as recited in claim 1, wherein the affixing means comprises an escutcheon adapted to be fastened to a wall outside surface, the escutcheon having an opening for receiving the guiding means, the aperture dimensioned for cooperating with an opening in the wall through which the flexible pipe passes, the escutcheon further adapted to be affixed to a portion of the guiding means.

4. The device as recited in claim 1, wherein the affixing means comprises a base plate affixed to a portion of the guiding means, the plate having means for fastening the plate to the structural support for holding the guiding means at the fixed position.

5. A valve mounting device useful in positioning a valve communicating with a flexible pipe, the device comprising:

a tubular sleeve having a bore dimensioned for receiving a valve, the valve having a supply tube exit portion extending radially therefrom, the tubular sleeve further having a notch for receiving the supply tube exit portion therein, the notch biasing against the supply tube exit portion during operation of the valve handle thus preventing rotation of the valve within the sleeve bore; and means for mounting the sleeve to a rigid structure, sufficiently rigid for supporting the tube in combination with the valve thereby securing the valve during operation of the valve handle and preventing rotation of the valve.

6. A valve mounting device useful with a valve connected to flexible pipe, the device comprising:

a base having a central portion and a peripheral portion, the peripheral portion dimensioned for covering a hole within a wall structure through which a flexible pipe extends for communicating with a valve, the central portion having an aperture dimensioned for receiving the pipe;

a tube having a bore dimensioned for receiving a valve portion communicating with the pipe, the tube having a proximal end and a distal end, the proximal end affixed to the base wherein the bore communicates with the aperture, the distal end having a notch within a portion of the tube wall, the notch dimensioned to receive a branch element of the valve for limiting rotation of the branch about the valve portion; and means for affixing the base to a surface of the wall structure for rigidly supporting the valve placed within the tube distal end.

7. The device recited in claim 6, wherein the base comprises an escutcheon having a generally circular disk-like shape, the escutcheon having a surface area sufficiently dimensioned for covering the wall structure hole.

8. The device as recited in claim 6, wherein the affixing means comprises holes within the base peripheral portion and screws dimensioned for being received by the peripheral holes for penetrating the wall structure for rigidly affixing the base to the structure.

9. The device as recited in claim 6, wherein the tube is integrally formed with the base, the tube dimensioned for receiving an angle stop valve wherein a body of the valve is closely received by the bore, the valve having a supply line input end communicating with the flexible pipe extending into the tube, the tube notch receiving a supply tube exit branch extending outwardly from the stop valve body.

* * * * *